United States Patent
Guo et al.

(10) Patent No.: US 11,912,814 B2
(45) Date of Patent: Feb. 27, 2024

(54) PREPARATION METHOD OF FLEXIBLE POLYURETHANE FOAM

(71) Applicant: NANJING TECH UNIVERSITY, Nanjing (CN)

(72) Inventors: Kai Guo, Nanjing (CN); Zheng Fang, Nanjing (CN); Junjie Tao, Nanjing (CN); Wei He, Nanjing (CN); Chengkou Liu, Nanjing (CN); Jindian Duan, Nanjing (CN); Xin Li, Nanjing (CN); Ning Zhu, Nanjing (CN); Jiangkai Qiu, Nanjing (CN); Shiyu Guo, Nanjing (CN); Pingkai Ouyang, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 577 days.

(21) Appl. No.: 17/228,445

(22) Filed: Apr. 12, 2021

(65) Prior Publication Data
US 2021/0230350 A1    Jul. 29, 2021

Related U.S. Application Data

(63) Continuation-in-part of application No. 16/221,329, filed on Dec. 14, 2018, now abandoned.

(51) Int. Cl.
| | |
|---|---|
| C08G 18/76 | (2006.01) |
| C08G 18/08 | (2006.01) |
| C08G 18/48 | (2006.01) |
| C08J 9/12 | (2006.01) |
| C08G 101/00 | (2006.01) |

(52) U.S. Cl.
CPC ......... C08G 18/7621 (2013.01); C08G 18/14 (2013.01); C08G 18/4895 (2013.01); C08J 9/125 (2013.01); C08G 2101/00 (2013.01); C08G 2110/0008 (2021.01); C08G 2110/0083 (2021.01); C08J 2203/10 (2013.01); C08J 2205/06 (2013.01); C08J 2375/08 (2013.01)

(58) Field of Classification Search
CPC .................................................. G08G 18/7621
See application file for complete search history.

(56) References Cited

U.S. PATENT DOCUMENTS

| | | | | |
|---|---|---|---|---|
| 4,230,824 A | * | 10/1980 | Nodelman | C08G 65/2606 536/120 |
| 8,084,631 B2 | * | 12/2011 | Roh | C08G 18/4829 554/227 |
| 2009/0253817 A1 | * | 10/2009 | Gu | C08G 18/4837 521/112 |
| 2013/0210951 A1 | * | 8/2013 | Hager | C11C 3/006 521/172 |
| 2016/0311789 A1 | * | 10/2016 | Guo | C07D 301/16 |
| 2017/0008850 A1 | * | 1/2017 | Guo | C07D 223/10 |

OTHER PUBLICATIONS

CN105330533 original (Year: 2016).*
CN105330533 translation (Year: 2016).*
CN106008951 original (Year: 2016).*
CN106008951 translation (Year: 2016).*

* cited by examiner

*Primary Examiner* — Irina Krylova
(74) *Attorney, Agent, or Firm* — CBM Patent Consulting, LLC

(57) ABSTRACT

A preparation method of a flexible polyurethane foam includes the following steps of: (1) subjecting an epoxidized vegetable oil, a benzoylformic acid, a basic catalyst, and an inert solvent to a ring-opening reaction in a first microchannel reactor of a microchannel reaction device to obtain a vegetable oil polyol; (2) subjecting the vegetable oil polyol obtained in the step (1), a propylene oxide and an inert solvent to an addition polymerization reaction in a second microchannel reactor of the microchannel reaction device to obtain a vegetable oil polyol for flexible polyurethane foam; and (3) using the vegetable oil polyol for flexible polyurethane foam obtained in the step (2) as the unique polyol, and subjecting the same and an isocyanate polyol to a foaming reaction to obtain the flexible polyurethane foam.

8 Claims, 1 Drawing Sheet

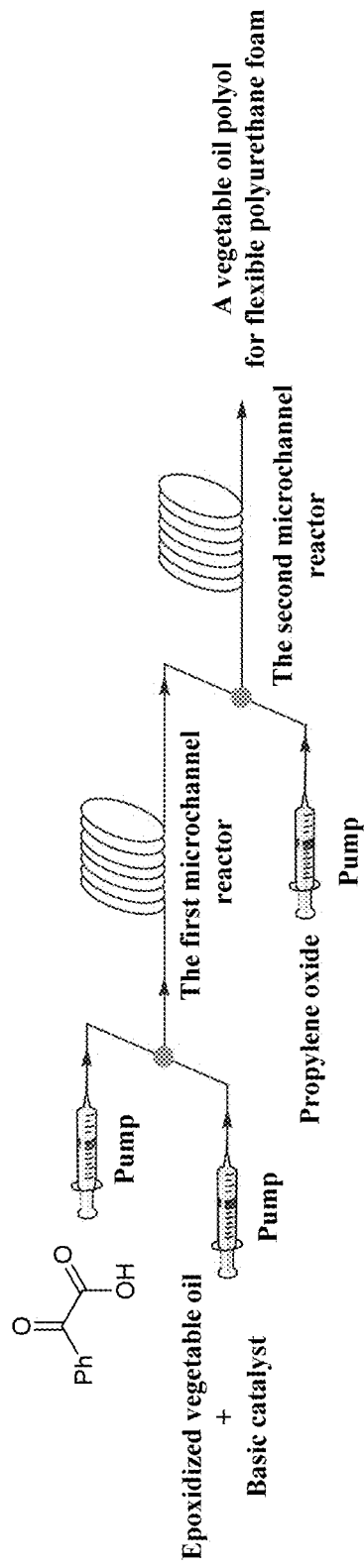

PREPARATION METHOD OF FLEXIBLE POLYURETHANE FOAM

This application is the continuation-in-part of U.S. Ser. No. 16/221,329 filed 14 Dec. 2018 that claims priority to Chinese Patent Application Ser. No. CN201811153269.8 filed on 29 Sep. 2018.

TECHNICAL FIELD

The invention belongs to the fields of chemical materials and production technologies thereof, and particularly relates to a preparation method of a flexible polyurethane foam.

BACKGROUND

Polyurethane is a polymer having a urethane chain segment repeating structural unit prepared by reacting an isocyanate with a polyol. Polyurethane products are divided into two categories: foaming products and non-foaming products. The foaming products include flexible, rigid, and semi-rigid polyurethane foamed plastics; the non-foaming products include a coating, a binder, a synthetic leather, an elastomer, an elastic fiber and the like. A polyurethane material has excellent performances, wide application and can be produced into a plurality of products, wherein the polyurethane foamed plastic is the most widely used. A flexible polyurethane foam, which refers to a flexible polyurethane foamed plastic, is a flexible polyurethane foamed plastic with certain elasticity, and is the most widely used product in polyurethane products.

Three types of polyols are mainly used in the polyurethane. One is a polymer obtained by polymerizing polyol or organic amine as a starting material with ethylene oxide, propylene oxide or butylene oxide, and is referred as a polyether polyol. Another modified graft polyether polyol is prepared on the basis of the polyether polyol and produced by bulk polymerization of a vinyl monomer in the polyol, which is referred as a polymer polyol, and is often used in combination with the polyether polyol. The third one is a polyol produced by the ring-opening polymerization of tetrahydrofuran. However, with the gradually decreasing reserves of petrochemical resources, prices of petrochemical products continue to rise and the petrochemical products are inconvenient to purchase, which directly affect the production of products. Therefore, seeking a new resource is an important research direction of the polyols in recent years so as to make products more economical and environmentally friendly while reducing dependence on the petrochemical products.

Natural oils are currently recognized as the unique renewable petroleum substitutes, among which a vegetable oil has the most ideal performances. A microbial decomposable natural polymer may be introduced into the polyurethane material through the reaction of isocyanates and vegetable oil polyol prepared from vegetable oil, hence achieving a purpose of biodegrading the polyurethane material. Therefore, the introduction of vegetable oil molecules into the polyurethane material by the vegetable oil polyol not only can solve the problems such as petroleum resource shortage, environmental pollution and the like, but also increase added values of the vegetable oil product. Moreover, vegetable oil-based polyurethane materials have mechanical properties comparable to those of polyurethane materials synthesized from corresponding petrochemical-based polyols, and have superior hydrolytic stability, resistance to thermal decomposition and thermal oxidation, and weather resistance.

However, in many processes for preparing vegetable oil polyols, petroleum-based products such as small molecule alcohols or amine compounds are mostly used as ring-opening agents, which do not meet the requirements of the sustainable development strategy of the green chemical industry. Moreover, these processes have the following defects: the preparation process is cumbersome, and the vegetable oil polyols produced are mostly only suitable for producing rigid polyurethane foam materials, but are not suitable for producing flexible polyurethane foam materials.

A conventional method for preparing vegetable oil polyols according to the present process is carried out in a batch mode of a reaction bottle. An epoxidized vegetable oil and most ring-opening reagents are immiscible, showing a liquid-liquid two-phase reaction, and the reaction belongs to an interface reaction. Therefore, a reaction rate is mainly controlled by mass transfer, and the reaction efficiency is low in a later stage of the reaction. It is necessary to strengthen the reaction by prolonging the time and raising the temperature, leading to more and more polyol targets as the reaction progresses slowly, which stay in the reaction system for a long time, and are prone to side reactions such as dimerization, trimerization and even tetramerization, thus making it very difficult to ensure a homogeneity of a product. Once the product is a mixture with poor homogeneity, it means that skeletons of the materials are different in sizes, and the distribution of hydroxyl groups is extremely irregular, so it is difficult to prepare a material with high homogeneity finally. In the existing design, it is very difficult to develop polyols with vegetable oils as raw materials, and there is no good solution at present. Therefore, the vegetable oil polyol and petrochemical polyol products are compounded to prepare the flexible polyurethane foam, and the advantage of relatively high homogeneity of the petrochemical polyol products is used to make up for the defects of bio-based polyols, and the bio-based polyols are dispersed into the petrochemical polyols to weaken the disadvantages of the bio-based polyols. Therefore, at this stage, there is a great need for a bio-based polyol product that does not need to add any petrochemical polyols, and only uses vegetable oil polyols as the sole source of polyols to meet the needs of preparing flexible polyurethane foams.

SUMMARY

One objective of the present invention is to overcome the dependence of the current preparation of polyether polyols on petrochemical resources, and to provide a vegetable oil polyol for flexible polyurethane foam, which has a novel structure and can completely replace the traditional petrochemical polyol for preparation of polyurethane foam materials.

Another objective of the present invention is to provide a method for preparing a vegetable oil polyol for flexible polyurethane foam, which overcomes the limitation of long reaction time, high energy consumption, low product quality and uncontinuous production for the production of the bio-based vegetable oil polyol by a batch process.

A final objective of the present invention is to provide a method of preparing a flexible polyurethane foam by using the vegetable oil polyol for flexible polyurethane foam.

To achieve the above objectives, technical solutions provided by the present invention are as follows:

A preparation method of a flexible polyurethane foam includes the following steps of:

(1) subjecting an epoxidized vegetable oil, a benzoylformic acid, a basic catalyst, and an inert solvent to a ring-opening reaction in a first microchannel reactor of a microchannel reaction device to obtain a vegetable oil polyol;

(2) subjecting the vegetable oil polyol obtained in the step (1), a propylene oxide and an inert solvent to an addition polymerization reaction in a second microchannel reactor of the microchannel reaction device to obtain the vegetable oil polyol for flexible polyurethane foam; and (3) using the vegetable oil polyol for flexible polyurethane foam obtained in the step (2) as the unique polyol, and subjecting the same and an isocyanate to a foaming reaction to obtain the flexible polyurethane foam.

Preferably, the preparation method of the flexible polyurethane foam includes the following steps of:

(1) simultaneously pumping a mixed solution prepared by dissolving an epoxidized vegetable oil and a basic catalyst in an inert solvent and a mixed solution prepared by dissolving benzoylformic acid in an inert solvent into a first microchannel reactor in a microchannel reaction device to subject to a ring-opening reaction to obtain a reaction solution containing the vegetable oil polyol;

(2) pumping a mixed solution prepared by dissolving the reaction solution containing the vegetable oil polyol and obtained in the step (1) and propylene oxide in an inert solvent into a second microchannel reactor of the microchannel reaction device to subject to an addition polymerization reaction to obtain a vegetable oil polyol for flexible polyurethane foam; and (3) a formula of the flexible polyurethane foam comprising the following components in parts by weight: 100 parts of vegetable oil polyol for flexible polyurethane foam; 8 parts of ethylene glycol; 0.5 part of stabilizer silicone oil B8681; 1 part of water; 1 part of triethylene diamine; and 1 part of toluene diisocyanate; and the preparation method including: weighing the above components by weight, mixing thoroughly and uniformly the components excluding the toluene diisocyanate at 25° C., adding the measured toluene diisocyanate, stirring for 10 s, pouring the mixture into a foaming box for to freely foam, and curing the same to obtain the flexible polyurethane foam.

More preferably, the preparation method of the flexible polyurethane foam includes the following steps of:

(1) separately pumping a mixed solution prepared by dissolving an epoxidized vegetable oil and a basic catalyst in an inert solvent and a mixed solution prepared by dissolving benzoylformic acid in an inert solvent into a first micromixer of a microchannel reaction device, fully mixing, then passing to a first microchannel reactor to subject to a ring-opening reaction to obtain a reaction solution containing a vegetable oil polyol;

(2) pumping a mixed solution, prepared by dissolving the reaction solution containing the vegetable oil polyol and obtained in the step (1) and propylene epoxide in an inert solvent, into a second micromixer of the microchannel reaction device, fully mixing, then passing to a second microchannel reactor to subject to an addition polymerization reaction to obtain the vegetable oil polyol for flexible polyurethane foam; and (3) a formula of the flexible polyurethane foam comprising the following components in parts by weight: 100 parts of vegetable oil polyol for flexible polyurethane foam; 8 parts of ethylene glycol; 0.5 part of stabilizer silicone oil B8681; 1 part of water; 1 part of triethylene diamine; and 1 part of toluene diisocyanate; and a preparation method including: weighing the above components by weight, mixing thoroughly and uniformly the components excluding the toluene diisocyanate at 25° C., adding the measured toluene diisocyanate, stirring for 10 s, pouring the mixture into a foaming box for to freely foam, and curing the same to obtain the flexible polyurethane foam.

The epoxidized vegetable oil in the step (1) is any one or more of epoxidized olive oil, epoxidized peanut oil, epoxidized rapeseed oil, epoxidized cotton seed oil, epoxidized soybean oil, epoxidized coconut oil, epoxidized palm oil, epoxidized sesame oil, epoxidized corn oil or epoxidized sunflower oil; preferably epoxidized soybean oil, epoxidized cottonseed oil or epoxidized palm oil; and more preferably epoxidized soybean oil. A molar ratio of an epoxy group in the epoxidized vegetable oil to the benzoylformic acid is 1:(0.8 to 1.5), preferably 1:(1.2 to 1.3).

The basic catalyst in the step (1) is any one or more of sodium hydroxide, potassium hydroxide, sodium methoxide, sodium ethoxide, sodium isopropoxide, sodium n-butoxide, sodium tert-butoxide, sodium carbonate, sodium bicarbonate, potassium methoxide, potassium ethoxide, potassium isopropoxide, potassium tert-butoxide, potassium carbonate and potassium bicarbonate; preferably sodium carbonate, wherein a mass percentage of the basic catalyst in the epoxidized vegetable oil is 0.02% to 0.10%, preferably 0.06%.

A reaction temperature of the ring-opening reaction in the step (1) is 80° C. to 150° C., preferably 100° C. to 150° C. A reaction time is 5 min to 20 min, preferably 8 min. A volume of the first microchannel reactor is 5 mL to 15 mL, preferably 10 mL.

A molar ratio of an epoxy group in the epoxidized vegetable oil in the step (1) to the propylene oxide in the step (2) is 1:(10 to 20), preferably 1:15. A reaction temperature of the addition polymerization reaction in the step (2) is 80° C. to 150° C., preferably 130° C. A reaction time is 10 min to 25 min, preferably 20 min. A volume of the second microchannel reactor is 20 mL to 70 mL, preferably 50 mL.

A reaction effluent of the second microchannel reactor in the step (2) is separated, and an organic phase is acid washed, neutralized, separated, rotary-evaporated, and dried to obtain the vegetable oil polyol for flexible polyurethane foam.

The acid is any one or more of hydrochloric acid, sulfuric acid, and phosphoric acid, and is preferably hydrochloric acid. The concentration of the hydrochloric acid is preferably 5 wt %. The organic phase is acid washed to a pH of 6.5 to 7.5.

The inert solvent is any one or more of dichloromethane, benzene, dichloroethane, chloroform, n-hexane, carbon tetrachloride, and xylene, and preferably dichloromethane or dichloroethane.

The microchannel reaction device includes the first micromixer, the first microchannel reactor, the second micromixer and the second microchannel reactor which are sequentially connected by a pipe. Reaction raw materials are input into the micromixers and subsequent devices via a precise pump with low pulsation level.

The first micromixer and the second micromixer are each independently a Y-type mixer or a Slit Plate Mixer LH25.

The first microchannel reactor and the second microchannel reactor are independently a polytetrafluoroethylene coil having an inner diameter from 0.5 mm to 1.5 mm, preferably 1.0 mm. The first microchannel reactor and the second microchannel reactor are each connected with a back pressure valve to prevent gasification.

Compared with a conventional reaction system, the microchannel reaction has the advantages of high reaction selectivity, high mass and heat transfer efficiency, high reaction activity, short reaction time, high conversion rate, good safety, easy control and the like. The application of a microchannel reaction technology in the polyhydroxy compound for ring-opening of epoxidized vegetable oil can improve the reaction efficiency, control the occurrence of side reactions, and reduce energy consumption.

Beneficial effects: compared with the prior art, the present invention has the advantages as follows.

The benzoylformic acid is used as a ring-opening reagent for epoxidized vegetable oil, the prepared vegetable oil polyol for flexible polyurethane foam has a novel structure and can completely replace the traditional petrochemical polyol for application to preparation of polyurethane foam materials. In the process of preparing the polyurethane foam, petrochemical polyol products need not be added at all, and the raw material is environmentally friendly and rich in source. In addition, the preparation method is in a continuous operation, the preparation process is easy to operate and control, the reaction time is short, the energy consumption is low, the reaction efficiency is improved, and the occurrence of side reactions is reduced. At the same time, the microchannel reaction device further has the characteristics that the production device is simple, easy to assemble and disassemble, and convenient to carry and move. The microchannel reaction device can be adjusted by simply increasing or decreasing the number of microchannels, and there is no "amplification effect" similar to industrial production.

BRIEF DESCRIPTION OF THE DRAWINGS

FIG. is a schematic diagram of a microchannel reaction device.

DETAILED DESCRIPTION

The present invention is further below in conjunction with specific examples.

Related determination methods for a vegetable oil polyol for flexible polyurethane foam and flexible polyurethane foam as prepared according to the present invention are as follows:

determining a hydroxyl value according to GB/T 12008.3-2009;
determining a viscosity according to GB/T 12008.7-2010;
determining a density of a foam plastic according to GB/T 6343-2009XX;
determining an indentation strength of the foam plastic according to GB/T 20467-2006XX;
determining a tensile strength of the foam plastic according to GB/T 6344-2008XX; and
determining a tear strength of foam according to GB/T 10808-2006.

A microchannel reaction device in the following examples, as shown in FIG. 1, includes a first micromixer, a first microchannel reactor, a second micromixer, and a second microchannel reactor which are sequentially connected by a pipe. Reaction raw materials are input into the micromixers and subsequent devices via a precise pump with low pulsation level. A first raw material storage tank (benzoylformic acid solution storage tank) is connected to a feed port of the first micromixer through the pump, a second raw material storage tank (epoxidized vegetable oil and basic catalyst solution storage tank) is connected to a feed port of the first micromixer through the pump, and a third raw material storage tank (propylene oxide solution storage tank) is connected to a feed port of the second micromixer through the pump.

The first micromixer and the second micromixer are both Y-type mixers. The first microchannel reactor and the second microchannel reactor are both polytetrafluoroethylene coils having an inner diameter of 1.0 mm and connected to a back pressure valve. The temperatures of the first microchannel reactor and the second microchannel reactor are both controlled by heating in an oil bath.

Example 1: Preparation of Vegetable Oil Polyol for Flexible Polyurethane Foam 50.57 g of benzoylformic acid was dissolved in 600 mL of dichloromethane to obtain a mixed solution A, 100 g of epoxidized soybean oil and 0.08 g of sodium carbonate were dissolved in 600 mL of dichloroethane to obtain a solution B, and 91.58 g of propylene oxide was dissolved in 1,200 mL of dichloroethane to obtain a solution C. A molar ratio of an epoxy group in the epoxidized soybean oil to the benzoylformic acid was 1:1.2, a mass percentage of the sodium carbonate in the epoxidized soybean oil was 0.08%, and a molar ratio of an epoxy group in the epoxidized soybean oil to the propylene oxide was 1:15. The mixed solution A and the solution B were separately and simultaneously pumped into the first micromixer in the microchannel reaction device, fully mixed, then passed into the first microchannel reactor and subjected to a ring-opening reaction to obtain a reaction solution containing a vegetable oil polyol. The obtained reaction solution containing the vegetable oil polyol and the solution C were pumped into the second micromixer in the microchannel reaction device, fully mixed, then passed into the second microchannel reactor and subjected to an addition polymerization reaction. A volume of the first microchannel reactor was 10 mL, a reaction temperature was 100° C., and a reaction time was 8 min; and a volume of the second microchannel reactor was 50 mL, a reaction temperature was 130° C., and a reaction time was 20 min Flow rates of the solutions A, B, and C were 0.625 mL/min, 0.625 mL/min, and 1.25 mL/min, respectively. After the completion of the reaction, a product was introduced into a separator and allowed to stand for layering to remove an aqueous solution in a lower layer. An upper organic phase was neutralized with 5 wt % hydrochloric acid to a pH value of 6.5 to 7.5 and separated. The organic phase was rotary-evaporated and dried to obtain the vegetable oil polyol for flexible polyurethane foam.

Example 2: Preparation of Vegetable Oil Polyol for Flexible Polyurethane Foam 75.82 g of benzoylformic acid was dissolved in 600 mL of dichloromethane to obtain a mixed solution A, 100 g of epoxidized soybean oil and 0.02 g of sodium carbonate were dissolved in 600 mL of dichloroethane to obtain a solution B, and 61.05 g of propylene oxide was dissolved in 1,200 mL of dichloroethane to obtain a solution C. A molar ratio of an epoxy group in the epoxidized soybean oil to the benzoylformic acid was 1:0.8, a mass percentage of the sodium carbonate in the epoxidized soybean oil was 0.02%, and a molar ratio of an epoxy group in the epoxidized soybean oil to the propylene oxide was 1:10. The mixed solution A and the solution B were separately and simultaneously pumped into the first micromixer in the microchannel reaction device, fully mixed, then passed into the first microchannel reactor and subjected to a ring-opening reaction to obtain a reaction solution containing a vegetable oil polyol. The obtained reaction solution containing the vegetable oil polyol and the solution C were pumped into the second micromixer in the microchannel reaction device, fully mixed, then passed into the second microchannel reactor and subjected to an addition polymerization reaction. A volume of the first microchannel reactor was 10 mL, a reaction temperature was 100° C., and a reaction time was 5 min; and a volume of the second microchannel reactor was 40 mL, a reaction temperature was 80° C., and a reaction time was 10 min Flow rates of the solutions A, B, and C were 1.0 mL/min, 1.0 mL/min, and 2.0 mL/min, respectively. After the completion of the reaction, a product was introduced into a separator and allowed to stand for layering to remove an aqueous solution in a lower layer. An upper organic phase was neutralized with 5 wt % hydrochloric acid to a pH value of 6.5 to 7.5 and separated. The organic phase was rotary-evaporated and dried to obtain the vegetable oil polyol for flexible polyurethane foam.

Example 3: Preparation of Vegetable Oil Polyol for Flexible Polyurethane Foam 94.81 g of benzoylformic acid was dissolved in 600 mL of dichloromethane to obtain a mixed solution A, 100 g of epoxidized soybean oil and 0.1 g of sodium carbonate were dissolved in 600 mL of dichloroethane to obtain a solution B, and 122.11 g of propylene oxide was dissolved in 1,200 mL of dichloroethane to obtain a solution C. A molar ratio of an epoxy group in the epoxidized soybean oil to the benzoylformic acid was 1:1.5, a mass percentage of sodium carbonate in the epoxidized soybean oil was 0.1%, and a molar ratio of an epoxy group in the epoxidized soybean oil to the propylene oxide was 1:20. The mixed solution A and the solution B were separately and simultaneously pumped into the first micromixer in the microchannel reaction device, fully mixed, then passed into the first microchannel reactor and subjected to a ring-opening reaction to obtain a reaction solution containing a vegetable oil polyol. The obtained reaction solution containing the vegetable oil polyol and the solution C were pumped into the second micromixer in the microchannel reaction device, fully mixed, then passed into the second microchannel reactor and subjected to an addition polymerization reaction. A volume of the first microchannel reactor was 10 mL, a reaction temperature was 150° C., and a reaction time was 20 min; and a volume of the second microchannel reactor was 25 mL, a reaction temperature was 150° C., and a reaction time was 25 min. Flow rates of the solutions A, B, and C were 0.25 mL/min, 0.25 mL/min, and 0.5 mL/min, respectively. After the completion of the reaction, a product was introduced into a separator and allowed to stand for layering to remove an aqueous solution in a lower layer. An upper organic phase was neutralized with 5 wt % hydrochloric acid to a pH value of 6.5 to 7.5 and separated. The organic phase was rotary-evaporated and dried to obtain the vegetable oil polyol for flexible polyurethane foam.

Example 4: Preparation of Vegetable Oil Polyol for Flexible Polyurethane Foam Different from Example 1, the epoxidized vegetable oil was epoxidized cottonseed oil, and a molar ratio of an epoxy group in the epoxidized cottonseed oil to the benzoylformic acid was 1:1.5, a molar ratio of an epoxy group in the epoxidized cottonseed oil to the propylene oxide was 1:12, and a mass percentage of sodium carbonate in the epoxidized cottonseed oil was 0.05%.

Example 5: Preparation of Vegetable Oil Polyol for Flexible Polyurethane Foam Different from Example 1, the epoxidized vegetable oil was epoxidized palm oil, a molar ratio of an epoxy group in the epoxidized palm oil to the benzoylformic acid was 1:1.3, a molar ratio of an epoxy group in the epoxidized palm oil to the propylene oxide was 1:15, and a mass percentage of the sodium carbonate in the epoxidized palm oil was 0.06%.

Example 6: Preparation of Flexible Polyurethane Foam

A formula of the flexible polyurethane foam included the following components in parts by weight: 100 parts of vegetable oil polyol for flexible polyurethane foam; 8 parts of ethylene glycol; 0.5 part of B8681 (stabilizer); 1 part of water; 1 part of triethylene diamine; and 1 part of toluene diisocyanate.

A preparation method included the following steps: weighing the above components in parts by weight, mixing thoroughly and uniformly at 25° C. (excluding the toluene diisocyanate), adding the measured toluene diisocyanate, stirring for 10 s, pouring the mixture into a foaming box to freely foam, and curing to obtain a conventional flexible polyurethane foam.

Table 1 shows performance indexes of the vegetable oil polyol for flexible polyurethane foam prepared in Examples 1 to 5. The flexible polyurethane foams were prepared using the vegetable oil polyol for flexible polyurethane foam obtained in Examples 1 to 5, and performance indexes of the obtained products are shown in Table 2.

TABLE 1

Performance indexes of vegetable oil polyol for flexible polyurethane foam

| Performance indexes | Example 1 | Example 2 | Example 3 | Example 4 | Example 5 |
|---|---|---|---|---|---|
| Hydroxyl value mgKOH/g | 31 | 38 | 42 | 38 | 46 |
| Viscosity mPas/25° C. | 860 | 812 | 648 | 960 | 760 |

TABLE 2

Performance indexes of polyurethane foam

| Test item | Example 1 | Example 2 | Example 3 | Example 4 | Example 5 |
|---|---|---|---|---|---|
| Density (kg/m$^3$) | 41.5 | 38.5 | 52.2 | 33 | 30.2 |

TABLE 2-continued

Performance indexes of polyurethane foam

| Test item | Example 1 | Example 2 | Example 3 | Example 4 | Example 5 |
|---|---|---|---|---|---|
| Indentation strength (25% IFD, N) | 136 | 113 | 85 | 106 | 105.5 |
| Tensile strength kPa | 116 | 108 | 120 | 103 | 121 |
| Elongation at break % | 127 | 115 | 131 | 135 | 144 |
| Resilience by ball rebound % | 61 | 43 | 51 | 58 | 39 |
| Tear strength N/m | 412 | 372 | 351 | 364 | 410 |
| Surface hardness | 46 | 51 | 45 | 48 | 60 |

Example 7

Example 7 was carried out in the same way as Example 1, except that the epoxidized soybean oil was replaced with an epoxidized olive oil, the sodium carbonate was replaced with a sodium hydroxide, the dichloromethane was replaced with a chloroform, and the dichloroethane was replaced with an n-hexane. Upon detection, the obtained vegetable oil polyol for flexible polyurethane foam had similar properties to the vegetable oil polyol for flexible polyurethane foam and obtained in Example 1.

Example 8

Example 8 was carried out in the same way as Example 1, only except that the epoxidized soybean oil was replaced with an epoxidized peanut oil, and the sodium carbonate was replaced with a sodium methoxide. Upon detection, a product obtained had similar properties to the product obtained in Example 1. Upon detection, the obtained vegetable oil polyol for flexible polyurethane foam had similar properties to the vegetable oil polyol for flexible polyurethane foam and obtained in Example 1.

Example 9

Example 9 was carried out in the same way as Example 1, only except that the epoxidized soybean oil was replaced with an epoxidized rapeseed oil, and the sodium carbonate was replaced with a sodium tert-butoxide. Upon detection, a product obtained had similar properties to the product obtained in Example 1. Upon detection, the obtained vegetable oil polyol for flexible polyurethane foam had similar properties to the vegetable oil polyol for flexible polyurethane foam and obtained in Example 1.

Example 10

Example 10 was carried out in the same way as Example 1, only except that the epoxidized soybean oil was replaced with an epoxidized corn oil, and the sodium carbonate was replaced with a sodium bicarbonate. Upon detection, a product obtained had similar properties to the product obtained in Example 1. Upon detection, the obtained vegetable oil polyol for flexible polyurethane foam was detected had similar properties to the vegetable oil polyol for flexible polyurethane foam and obtained in Example 1.

Example 11

Example 11 was carried out in the same way as Example 1, only except that the epoxidized soybean oil was replaced with an epoxidized sesame oil, and the sodium carbonate was replaced with a potassium ethoxide. Upon detection, a product obtained had similar properties to the product obtained in Example 1. Upon detection, the obtained vegetable oil polyol for flexible polyurethane foam had similar properties to the vegetable oil polyol for flexible polyurethane foam and obtained in Example 1.

Comparative Example 1

A supplementary experiment was the same as Example 1 of instant specification, with the difference that: the micromolecule ring-opening reagent glycol in He et al (CN106008951A) was used as the ring-opening reagent of the present invention, and the batch method in He et al was adopted for reaction.

94.81 g of epoxypropane was dissolved in 1,200 mL of dichloroethane to obtain a solution A, 20.93 g of glycol, 100 g of epoxidized soybean oil, 0.08 g of sodium carbonate and 1200 mL of dichloroethane were mixed, reacted at 100° C. under normal pressure, stirred at 600 rpm for 8 hours, then the solution A was added into the reaction kettle, reacted at 130° C. and stirred at 600 rpm for 6 hours. After the completion of the reaction, a product was introduced into a separator and allowed to stand for layering to remove an aqueous solution in a lower layer. An upper organic phase was neutralized with 5 wt % hydrochloric acid to a pH value of 6.5 to 7.5 and separated. The organic phase was rotary-evaporated and dried to obtain a vegetable oil polyol for flexible polyurethane foam, with a hydroxyl value of 118 mgKOH/g, a viscosity of 3,650 mPas/25° C., a density of 47 kg/m$^3$, an indentation hardness of 78.25% IFD, N, a tensile strength of 139 kPa, an elongation at break of 93%, a ball rebound resilience of 21%, a tear strength of 156 N/m, and a surface hardness of 174.

Comparative Example 2

A supplementary experiment was the same as Example 1 of instant specification, with the difference that: the micromolecule ring-opening reagent glycol in He et al (CN106008951A) was used as the ring-opening reagent of the present invention, and the reaction was conducted in a micro-reaction device. The obtained vegetable oil polyol for flexible polyurethane foam has a hydroxyl value of 64 mgKOH/g, a viscosity of 1,140 mPas/25° C., a density of 35 kg/m$^3$, an indentation hardness of 69.25% IFD, N, a tensile strength of 96 kPa, an elongation at break of 95%, a ball rebound resilience of 27%, a tear strength of 283 N/m, and a surface hardness of 82.

Comparative Example 3

A supplementary experiment was the same as Example 1 of instant specification, with the difference that: batch reactions were conducted in a conventional reactor.

91.58 g of epoxypropane was dissolved in 1,200 mL of dichloroethane to obtain a solution A, 50.57 g of benzoyl-formic acid, 100 g of epoxidized soybean oil, 0.08 g of sodium carbonate and 1,200 mL of dichloroethane were mixed, reacted at 100° C. under normal pressure, stirred at 600 rpm for 8 hours, then the solution A was added into the reaction kettle, reacted at 130° C. and stirred at 600 rpm for 6 hours. After the completion of the reaction, a product was introduced into a separator and allowed to stand for layering to remove an aqueous solution in a lower layer. An upper organic phase was neutralized with 5 wt % hydrochloric acid to a pH value of 6.5 to 7.5 and separated. The organic phase was rotary-evaporated and dried to obtain a vegetable oil polyol for flexible polyurethane foam, with a hydroxyl value of 107 mgKOH/g, a viscosity of 3,120 mPas/25° C., a density of 43 kg/m$^3$, an indentation hardness of 70.25% IFD, N, a tensile strength of 113 kPa, an elongation at break of 53%, a ball rebound resilience of 23%, a tear strength of 172 N/m, and a surface hardness of 158.

Comparative Example 4

A supplementary experiment was the same as Example 1 of instant specification, with the difference that: the micro-molecule ring-opening reagent 2-ethylhexanoic acid in Roh et al (U.S. Pat. No. 8,084,631) was used as the ring-opening reagent of the present invention, and the reaction was conducted in a micro-reaction device. The obtained vegetable oil polyol for flexible polyurethane foam has a hydroxyl value of 139 mgKOH/g, a viscosity of 2,480 mPas/25° C., a density of 39 kg/m$^3$, an indentation hardness of 65.25% IFD, N, a tensile strength of 107 kPa, an elongation at break of 63%, a ball rebound resilience of 13%, a tear strength of 132 N/m, and a surface hardness of 145.

TABLE 3

Performance indexes of vegetable oil polyol for flexible polyurethane foam

| Performance indexes | Instant Experiments | Comparative Example 1 | Comparative Example 2 | Comparative Example 3 | Comparative Example 4 |
| --- | --- | --- | --- | --- | --- |
| Hydroxyl value mgKOH/g | 31 to 46 | 118 | 64 | 107 | 139 |
| Viscosity mPas/25° C. | 648 to 960 | 3,650 | 1,140 | 3,120 | 2,480 |

Table 3 shows the vegetable oil polyol prepared by instant method has lowest viscosity that is best for foaming when polyurethane foam would be made.

TABLE 4

Performance indexes of polyurethane foam

| Test item | Instant Experiments | Comparative Example 1 | Comparative Example 2 | Comparative Example 3 | Comparative Example 4 |
| --- | --- | --- | --- | --- | --- |
| Density (kg/m$^3$) | 30.2-52.2 | 47 | 35 | 43 | 39 |
| Indentation strength (25% IFD, N) | 85 to 136 | 78 | 69 | 70 | 65 |
| Tensile strength kPa | 103 to 121 | 139 | 96 | 113 | 107 |
| Elongation at break % | 115 to 144 | 93 | 95 | 53 | 63 |
| Resilience by ball rebound % | 43 to 61 | 21 | 27 | 23 | 13 |
| Tear strength N/m | 351 to 412 | 156 | 283 | 172 | 132 |
| Surface hardness | 45 to 60 | 174 | 82 | 158 | 145 |

Table 4 shows the properties of polyurethane foam prepared by vegetable oil polyol made by instant method and the methods in Comparative Examples 1-4. Instant polyurethane foam has high density (better performances), high Indentation hardness (harder), high Tensile strength (stronger), high Elongation at break (harder and the more brittle), high Ball rebound resilience (more flexible), high Tear strength (stronger) and high Surface hardness (greater hardness in the surface).

What is claimed is:

1. A method for preparing a flexible polyurethane foam, comprising the following steps of:
    (1) subjecting an epoxidized vegetable oil, a benzoylformic acid, a basic catalyst, and an inert solvent to a ring-opening reaction in a first microchannel reactor of a microchannel reaction device to obtain a vegetable oil polyol;
    (2) subjecting the vegetable oil polyol obtained in the step (1), a propylene oxide and the inert solvent to an addition polymerization reaction in a second microchannel reactor of the microchannel reaction device to obtain a vegetable oil polyol for the flexible polyurethane foam, wherein the vegetable oil polyol for the flexible polyurethane foam comprises a hydroxyl value of 31-46 mg KOH/q and viscosity of 648-960 mPas at 25° C.;
    (3) using the vegetable oil polyol for the flexible polyurethane foam obtained in the step (2) as a unique polyol, preparing a formulation comprising the following components in parts by weight:
    100 parts of the vegetable oil polyol for the flexible polyurethane foam obtained in the step (2); 8 parts of ethylene glycol; 0.5 parts of stabilizer silicone oil B8681; 1 part of water; 1 part of triethylene diamine; and 1.0 part of toluene diisocyanate; wherein preparing the formulation comprises: weighing the above components excluding the toluene diisocyanate by weight first, mixing thoroughly at 25° C., adding the measured toluene diisocyanate, and stirring for 10s, and
    (4) pouring the mixture produced in the step (3) into a foaming box for a foaming reaction and curing to obtain the flexible polyurethane foam,
    wherein a molar ratio of an epoxy group in the epoxidized vegetable oil in the step (1) to the propylene oxide in the step (2) is 1:(10-20), and
    wherein the produced flexible polyurethane foam is having the following properties:
    density of 30.2-52.2 kg/m$^3$;
    indentation strength (25% IFD) of 85-136 N;
    resilience by ball rebound 51-61%;
    elongation at break of 115-144%;
    tensile strength of 103-121 kPa and
    tear strength of 351-412 N/m.

2. The method of claim 1, wherein the steps (1) and (2) comprise the following steps of:
    (1) simultaneously pumping a mixed solution prepared by dissolving the epoxidized vegetable oil and the basic catalyst in the inert solvent and a mixed solution prepared by dissolving the benzoylformic acid in the inert solvent into the first microchannel reactor in the microchannel reaction device to subject to a ring-opening reaction to obtain a reaction solution containing the vegetable oil polyol;
    (2) pumping a mixed solution prepared by dissolving the reaction solution containing the vegetable oil polyol obtained in the step (1) and the propylene oxide in the inert solvent into the second microchannel reactor of the microchannel reaction device to subject to an addition polymerization reaction to obtain the vegetable oil polyol for the flexible polyurethane foam.

3. The method of claim 1, wherein the epoxidized vegetable oil in the step (1) is any one or more of epoxidized olive oil, epoxidized peanut oil, epoxidized rapeseed oil, epoxidized cotton seed oil, epoxidized soybean oil, epoxidized coconut oil, epoxidized palm oil, epoxidized sesame oil, epoxidized corn oil or epoxidized sunflower oil, wherein a molar ratio of an epoxy group in the epoxidized vegetable oil to the benzoylformic acid is 1:(0.8-1.5), and the basic catalyst is any one or more of sodium hydroxide, potassium hydroxide, sodium methoxide, sodium ethoxide, sodium isopropoxide, sodium n-butoxide, sodium tert-butoxide, sodium carbonate, sodium bicarbonate, potassium methoxide, potassium ethoxide, potassium isopropoxide, potassium tert-butoxide, potassium carbonate and potassium bicarbonate, wherein a mass percentage of the basic catalyst in the epoxidized vegetable oil is 0.02% to 0.10%.

4. The method of claim 1, wherein a reaction temperature of the ring-opening reaction in the step (1) is 80° C. to 150° C., a reaction time is 5 min to 20 min, and a volume of the first microchannel reactor is 5 mL to 15 mL.

5. The method of claim 1, wherein a reaction temperature of the addition polymerization reaction in the step (2) is 80° C. to 150° C., a reaction time of the addition polymerization reaction is 10 min to 25 min, and a volume of the second microchannel reactor is 20 mL to 70 mL.

6. The method of claim 1, wherein a reaction effluent of the second microchannel reactor in the step (2) is separated, and an organic phase is acid washed, neutralized, separated, rotary-evaporated, and dried to obtain the vegetable oil polyol for the flexible polyurethane foam.

7. The method of claim 1, wherein the inert solvent is any one or more of dichloromethane, benzene, dichloroethane, chloroform, n-hexane, carbon tetrachloride, and xylene.

8. The method of claim 1, wherein the microchannel reaction device comprises a first micromixer, a first microchannel reactor, a second micromixer and a second microchannel reactor which are sequentially connected by a pipe, and the reaction raw materials are input into the micromixers and subsequent equipment via a pump with precise and low pulsation.

* * * * *